United States Patent [19]

Davidson et al.

[11] Patent Number: 5,506,078
[45] Date of Patent: Apr. 9, 1996

[54] METHOD OF FORMING A STABLE FORM OF LIMNO₂ AS CATHODE IN LITHIUM CELL

[75] Inventors: Isobel J. Davidson, Orleans; Roderick S. McMillan; John J. Murray, both of Gloucester, all of Canada

[73] Assignee: National Research Council of Canada, Ottawa, Canada

[21] Appl. No.: 429,001

[22] Filed: Apr. 26, 1995

Related U.S. Application Data

[62] Division of Ser. No. 104,639, Aug. 11, 1993, abandoned.

[51] Int. Cl.⁶ .............................. H01M 4/58; H01M 6/14
[52] U.S. Cl. ............................. 429/224; 429/197
[58] Field of Search ...................... 429/224, 197

[56] References Cited

U.S. PATENT DOCUMENTS

| | | | |
|---|---|---|---|
| 4,893,476 | 1/1991 | Slane et al. | 429/197 |
| 5,169,736 | 12/1992 | Bittihn et al. | 429/194 |
| 5,219,684 | 6/1993 | Wilkinson et al. | |

FOREIGN PATENT DOCUMENTS

| | | |
|---|---|---|
| 457741 | 11/1991 | European Pat. Off. |
| 2139862 | 8/1990 | Japan. |
| 4075267 | 3/1992 | Japan. |

OTHER PUBLICATIONS

Hoppe et al., *J. Anorg. Allg. Chem.*, 417, 1 (no month) (1975).

Ohzuku et al. *Chemistry Express*, 7, 193 (no month) (1992).

*Primary Examiner*—John S. Maples
*Attorney, Agent, or Firm*—J. Wayne Anderson

[57] ABSTRACT

The invention disclosed relates to a new method of forming spinel-related $\lambda$-$Li_{2-x}Mn_2O_4$, wherein $0 \leq x \leq 2$, solely by electrochemical means with air-stable orthorhombic $LiMnO_2$ as the starting material. This spinel-related material is hydroscopic, metastable and is typically made by chemical means, followed by electrochemical conversion of spinel-type $LiMn_2O_4$. Also disclosed are new secondary lithium ion electrochemical cells employing as initial active cathode material a compound of formula $LiMnO_2$, having a specific orthorhombic crystal structure.

8 Claims, 5 Drawing Sheets

METHOD OF FORMING A STABLE FORM OF LIMNO₂ AS CATHODE IN LITHIUM CELL

This application is a Division of application Ser. No. 08/104,639, filed on Aug. 11, 1993, now abandoned.

BACKGROUND OF THE INVENTION

This invention relates to a novel method of forming spinel-related $\lambda\text{-Li}_{2-x}\text{Mn}_2\text{O}_4$, wherein $0 \leq x \leq 2$, in a secondary electrochemical cell, and to the use of a compound of formula $\text{LiMnO}_2$ which has a specific orthorhombic crystal structure, as initial active cathode material in such cells.

The impetus for this invention was the recent, great increase in demand for batteries having high energy density and low weight, such as had already been achieved with metallic lithium systems, but which are also rechargeable. Lithium electrodes do not meet this requirement over extended periods of time because even in an aprotic organic solvent the cycling stability is severely limited, and problems with cell safety arise.

An electrochemical cell in which both the anode and the cathode are lithium intercalation compounds is termed a lithium ion cell. The intercalation compound serves as a host structure for lithium ions which are either stored or released depending on the polarity of an externally applied potential. During discharge, the electromotive force reverses the forced intercalation or de-intercalation thereby producing current.

In a lithium ion cell, the positive electrode generally serves as the initial reservoir of lithium. The capacity of the cell will be limited by the amount of lithium present in the positive electrode on cell assembly. In most cases, only a proportion of the lithium present, during fabrication of the positive electrode, can be reversibly removed (i.e. cycled).

$\text{LiMnO}_2$ is known to exist in several phases. Two phases, whose crystal structures have been well characterized, are a high temperature orthorhombic phase and a tetragonal phase. Both structures involve cubic closest packing but they differ in the arrangement of the ordering of the lithium and manganese cations. The tetragonal form is normally written as $\lambda\text{-Li}_2\text{Mn}_2\text{O}_4$. It has an atacamite-type structure which is often referred to as being spinel related. Another type of lithium manganate has a spinel structure of composition $\text{LiMn}_2\text{O}_4$.

DESCRIPTION OF THE PRIOR ART

One approach to improving the reversibility of lithium electrodes involves the use of intercalation compounds.

Both $\text{LiMn}_2\text{O}_4$ and $\lambda\text{-Li}_2\text{Mn}_2\text{O}_4$ have been used as cathodes in lithium ion cells [U.S. Pat. Nos. 5,135,732 and 5,110,696, and J. M. Tarascon and D. Guyomard, *J. Electrochem. Soc.*, 138 2864 (1991)]. $\lambda\text{-Li}_2\text{Mn}_2\text{O}_4$ has twice the nominal capacity of $\text{LiMn}_2\text{O}_4$ but it is reported to be hydroscopic and metastable [A. Mosbah, A. Verbaere and M. Tournoux, *Mat. Res. Bull.*, 18 1375 (1983)]. Specifically, spinel-related $\lambda\text{-LiMn}_2\text{O}_4$ is typically made by first heating lithium carbonate with manganese dioxide, or reacting these two compounds in the presence of a lithium source to form spinel-type $\text{LiMn}_2\text{O}_4$, followed by electrochemical conversion to $\lambda\text{-Li}_2\text{Mn}_2\text{O}_4$. Neither process is very satisfactory. Moreover, lithium is pyrophoric and causes handling problems.

In the reference [J. M. Tarascon and D. Guyomard, *J. Electrochem. Soc.*, 138, 2864 (1991)] it is reported that $\lambda\text{-Li}_2\text{Mn}_2\text{O}_4$ slowly decomposes in ambient conditions to $\text{LiMn}_2\text{O}_4$. $\lambda\text{-Li}_2\text{Mn}_2\text{O}_4$ converts to the high temperature orthorhombic form, $\text{LiMnO}_2$, when heated in an argon atmosphere to 600° C. It is prepared by electrochemically, or chemically, intercalating lithium into the $\text{LiMn}_2\text{O}_4$ spinel structure, as described in the two preceding references.

The structure of the high temperature orthorhombic phase of $\text{LiMnO}_2$ was determined in detail by R. Hoppe, G. Brachtel and M. Jansen, [*J. Anorg. Allg. Chem.*, 417 1 (1975)]. This structure is described by the space group Pmnm and has unit cell dimensions a=4.572 Å, b=5.75 Å and c=2.805 Å. To our knowledge, the use of $\text{LiMnO}_2$, having this structure, as the active material in the cathode of a reversible electrochemical cell has never been demonstrated. Recently, T. Ohzuku, A. Ueda and T. Hirai [*Chemistry Express*, 7 193 (1992)] have demonstrated the use of a low temperature form of orthorhombic $\text{LiMnO}_2$ as the active cathode material in a reversible lithium ion cell. The low temperature form of orthorhombic $\text{LiMnO}_2$ was prepared by heating an equimolar mixture of γ-MnOOH and LiOH·H₂O to 450° C. For the sake of simplicity, the high temperature form of orthorhombic $\text{LiMnO}_2$ with the structure described by Hoppe, Brachtel and Jansen will henceforth be referred to as orthorhombic $\text{LiMnO}_2$.

SUMMARY OF THE INVENTION

It is an object of the present invention to provide a novel method of forming spinel-related $\lambda\text{-Li}_{2-x}\text{Mn}_2\text{O}_4$, wherein $0 \leq x \leq 2$, in the cathode of a secondary lithium ion electrochemical cell.

It is another object of the present invention to provide a secondary electrochemical cell of high energy density, whose charge/discharge mechanism is based upon alternating intercalation and de-intercalation of Li⁺ ions in the active materials of the positive and negative electrodes.

It is yet another object to provide good chemical resistance to the electrolyte and high cycling stability.

According to one aspect of the invention, a method of forming spinel-related $\lambda\text{-Li}_{2-x}\text{Mn}_2\text{O}_4$, wherein $0 \leq x \leq 2$, in the cathode of a secondary lithium ion cell is provided, which comprises (a) providing a secondary lithium ion electrochemical cell, said cell comprising a lithium intercalation anode, a suitable non-aqueous electrolyte including a lithium salt, a cathode containing as initial active material orthorhombic $\text{LiMnO}_2$ characterized by the specific orthorhombic crystal structure described by the space group Pmnm and unit cell dimensions a=4.572 Å, b=5.757 Å and c=2.805 Å, and a separator between the anode and cathode, and (b) charging the cell to de-intercalate sufficient available lithium ions to convert the $\text{LiMnO}_2$ to spinel-type $\text{LiMn}_2\text{O}_4$, and (c) discharging the cell to intercalate sufficient available lithium ions to convert the spinel-type $\text{LiMn}_2\text{O}_4$ to spinel-related $\lambda\text{-Li}_{2-x}\text{Mn}_2\text{O}_4$.

Preferably, the cell is charged to greater than 40–50% of the nominal cathode capacity, and discharged to 30–40% of the nominal cathode capacity.

According to another aspect of the invention, the use of a compound of formula $\text{LiMnO}_2$ characterized by the specific orthorhombic crystal structure, described by the space group Pmnm and unit cell dimensions a=4.572 Å, b=5.757 Å and c=2.805 Å, as initial active cathode material in secondary lithium ion electrochemical cells is also provided.

According to yet another aspect of the invention, a secondary lithium ion electrochemical cell comprising a lithium intercalation anode, a suitable non-aqueous electrolyte including a lithium salt, a cathode containing as initial active material orthorhombic $LiMnO_2$ characterized by the specific orthorhombic crystal structure described by the space group Pmnm and unit cell dimensions a=4.572 Å, b=5.757 Å and c=2.805 Å, and a separator between the anode and cathode, is provided.

The orthorhombic $LiMnO_2$ is converted to spinel-type $LiMn_2O_4$ on the first charge, and upon discharge spinel-related $\lambda$-$Li_{2-x}Mn_2O_4$ is formed. Accordingly, the cell behaves the same way as a cell built with $\lambda$-$Li_{2-x}Mn_2O_4$ as the initial cathode material. However, $LiMnO_2$ is much simpler to prepare than $\lambda$-$Li_{2-x}Mn_2O_4$ which is not air-stable. See example 1 below.

The anode of the present invention serves as the recipient substance for $Li^+$ ions. The anode can be any intercalation compound which is capable of intercalating lithium and has an electrode potential sufficiently reducing to provide an adequate cell voltage over a range of lithium intercalation. Specific examples include transition metal oxides such as $MoO_2$ or $WO_2$ [Auborn and Barberio, *J. Electrochem. Soc.* 134 638 (1987)], transition metal sulfides (see U.S. Pat. No. 4,983,476) or carbon products obtained by the pyrolysis of organic compounds. (The disclosures of the aforementioned two documents are Incorporated Herein by Reference.) As will be apparent hereinafter, various commercially available carbonaceous materials of predetermined structural characteristics have proven useful.

The non-aqueous electrolyte of the present invention can be liquid, paste-like or solid. Preferably, the electrolyte includes a lithium salt with an organic solvent, and is in liquid form. Electrolyte salts useful for this purpose are $LiAsF_6$, $LiPF_6$, $LiBF_4$, $LiClO_4$, LiBr, $LiAlCl_4$, $LiCF_3SO_3$, $LiC(CF_3SO_2)_3$, $LiN(CF_3SO_2)_2$, or mixtures thereof. As a water-free solvent for these salts, there can be used alone or in mixture with others an organic solvent of the group propylene carbonate, ethylene carbonate, 2-methyl tetrahydrofuran, tetrahydrofuran, dimethoxyethane, diethoxyethane, dimethyl carbonate, diethyl carbonate, methyl acetate, methylformate, γ-butyrolactone, 1,3-dioxolane, sulfolane, acetonitrile, butyronitrile, trimethylphosphate, dimethylformamide and other like organic solvents. The electrolyte solution can also contain additives such as Crown ethers e.g. 12-C-4,15-C-5, and 18-C-6, or immobilizing agents such as polyethylene oxide or inorganic gel-forming compounds such as $SiO_2$, or $Al_2O_3$ such as described in U.S. Pat. No. 5,169,736, the disclosure of which is Incorporated Herein by Reference.

The cathode, having orthorhombic $LiMnO_2$ as the initial active material, has an electrochemical potential sufficiently positive of the negative electrode to produce a useful overall cell voltage. The greater the potential, the greater the resulting energy density. In a lithium ion cell, the positive electrode generally serves as the initial reservoir of lithium. The capacity of the cell will be limited by the amount of lithium, available for de-intercalation, present in the positive electrode on cell assembly. In most cases, only a proportion of the lithium present, during fabrication of the positive electrode, can be reversibly deintercalated. The capacity of a lithium ion cell having a cathode of orthorhombic $LiMnO_2$ as initial active material increases after the first cycle in which the original structure is converted to spinel-related $\lambda$-$Li_{2-x}Mn_2O_4$.

DESCRIPTION OF THE PREFERRED EMBODIMENT(S)

Orthorhombic $LiMnO_2$ has been found to be air-stable, and easily fabricated into cathodes for use in secondary lithium ion electrochemical cells of high reversible capacity.

The preferred negative electrode is based on a carbonaceous product. Petroleum coke is particularly preferred. Petroleum cokes are non-graphitic carbons which can intercalate up to approximately one lithium ion per twelve carbon atoms.

Suitable anode carbonaceous materials include:
1) carbonaceous material with a $d_{002}$ layer spacing of less than or equal to 3.70 Å with true density of greater than or equal to 1.70 g/cm³ prepared by carbonization of furan resins, as per U.S. Pat. No. 4,959,281.
2) the above doped with 2–5% phosphorous and oxygenated petroleum or coal pitch carbonized and doped with 2–5% phosphorous with the same $d_{002}$ layer spacing and true density as per published European application No: EP 0 418 514.
3) carbons formed by the thermal decomposition of gas phase hydrocarbons or hydrocarbon compounds with $d_{002}$ from 3.37 to 3.55 Å as per U.S. Pat. No. 4,863,814.
4) carbon formed from mesophase microspheres with $d_{002}$ layer spacing up to 3.45 Å as per U.S. Pat. No. 5,153,082.
5) commercial petroleum coke as per U.S. Pat. No. 4,943,497.
6) isotropic graphite composed of a mixture of graphite and carbonized pitch with a degree of graphitization greater than or equal to 0.4 and heat treated fluid coke and commercial graphite whose first lithium electrochemical intercalation is performed at or above 50° C., as per U.S. Pat. No. 5,028,500.

(The disclosure of the aforementioned 6 references are incorporated herein by reference).

Typical electrodes in the present invention are fabricated from 80–94 weight percent of active material, carbon coke or $LiMnO_2$, 5–15 weight percent of a conductivity enhancer such as Super S carbon black, and 1–5 weight percent of a binder such as ethylene propylene diene monomer (EPDM). Other conductivity enhancers such as Shawinigan Acetylene Black, graphites or other conductive materials may be used. In addition, other binders such as Teflon®, poly(vinylidene difluoride), polyolefins or elastomers may be substituted for EPDM.

EXAMPLE 1

A sample of lithium manganese oxide of formula $LiMnO_2$ characterized by an orthorhombic crystal structure in accordance with the present invention was made by reacting $Li_2CO_3$ and $\beta$-$MnO_2$ in proportions such that the atomic ratio between lithium in $Li_2CO_3$ and the manganese in the $\beta$-$MnO_2$ was 1:1.

Figure 1:
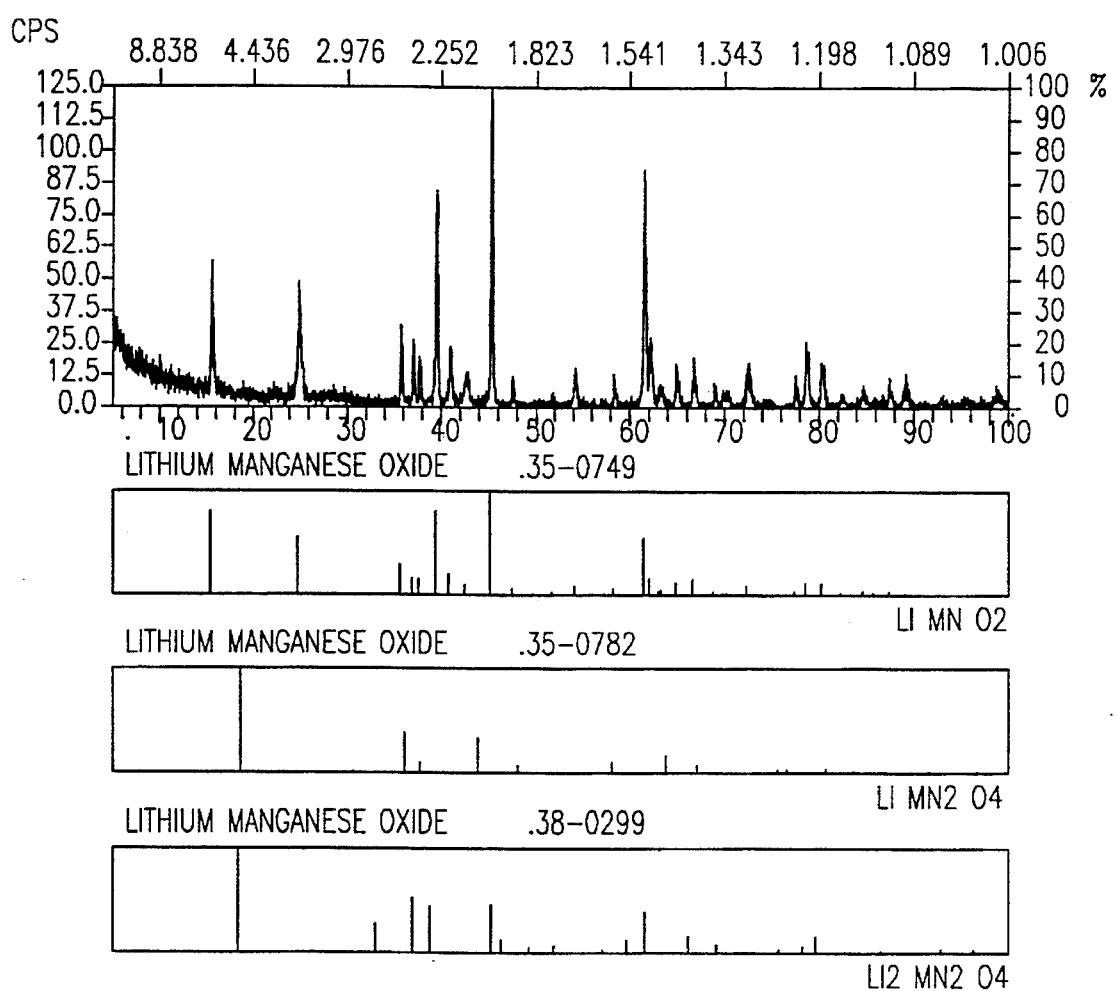
FIG. 1 is the trace of the X-ray diffraction pattern of orthorhombic $LiMnO_2$, prepared as described in example 1. The JCPDF powder X-ray diffraction pattern for orthorhombic $LiMnO_2$ is included for comparison.
Figure 2:
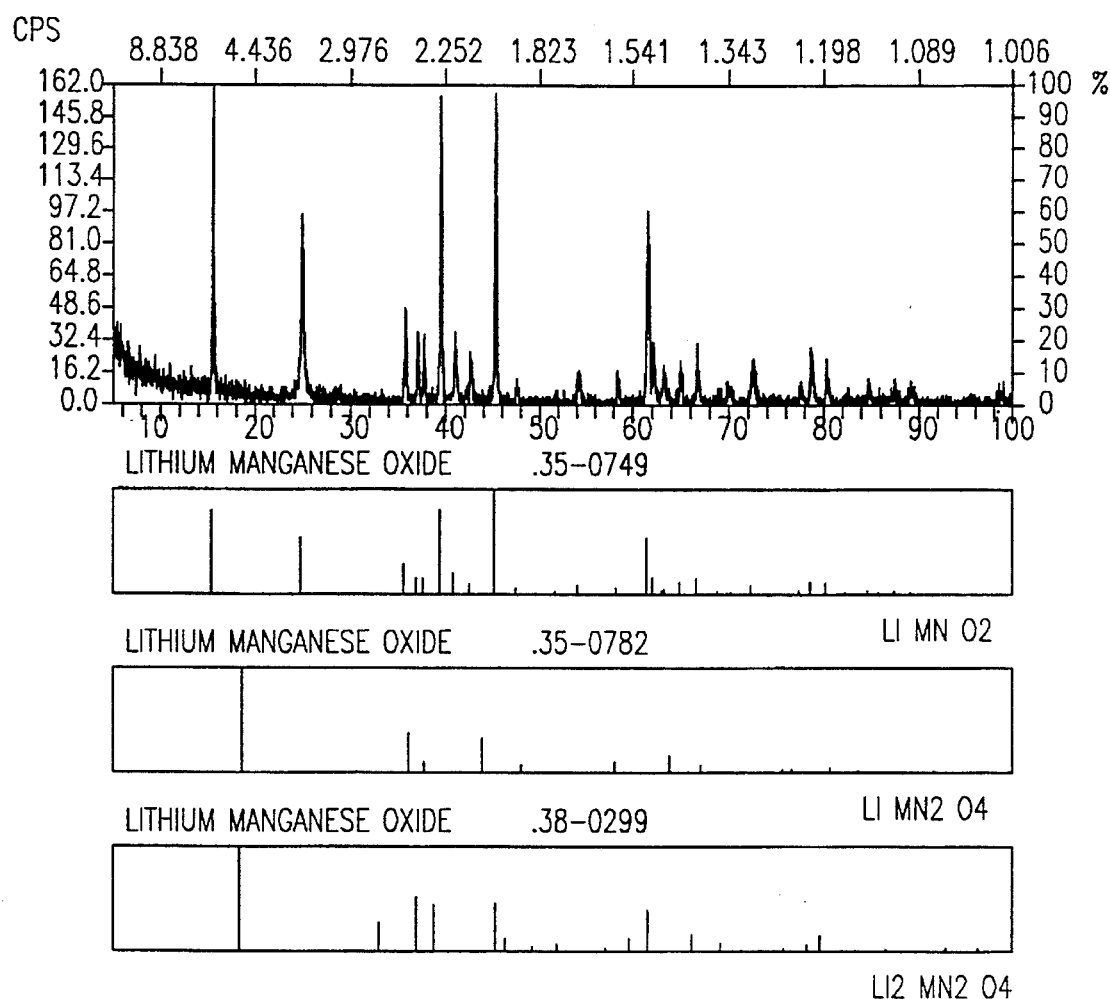
FIG. 2 is the trace of the X-ray diffraction pattern, for the same sample as in FIG. 1, taken after 11 months of storage in ambient conditions.

The $Li_2CO_3$ and $\beta$-$MnO_2$ were mixed using a mortar and pestle until the mixture was substantially homogenous. The resulting powder was formed into pellets in a 18 mm die, and then heated, in a flow of argon gas, at 600° C. for two hours followed by two intervals of three days each at 800° C. The sample was ground again between the two firings. The product was examined by X-ray diffraction. FIG. 1 shows the trace of the X-ray diffraction pattern of the product from the second firing and the reported diffraction pattern for orthorhombic $LiMnO_2$, powder diffraction file card #35-0749, from the JCPDS International Centre for Diffraction Data. FIG. 2 shows the trace of an X-ray diffraction pattern of the same sample after 11 months of storage in ambient conditions. The second diffraction pattern is substantially identical to the first. Unlike $\lambda$-$Li_2Mn_2O_4$, the orthorhombic form of $LiMnO_2$ is air and moisture stable.

EXAMPLE 2

An electrochemical cell was assembled with a cathode containing as the initial active material, orthorhombic $LiMnO_2$, formed by reacting stoichiometric amounts of $Li_2CO_3$ and $\beta$-$MnO_2$ in a manner similar to Example 1, except that reaction temperature was increased to 900° C.

The cathode was prepared by drying a slurry made from orthorhombic $LiMnO_2$ with two weight percent of ethylene propylene diene monomer (EPDM) and 10 wt. % Super S carbon black in cyclohexane. The carbon anode was made from Asbury petroleum coke, with 2 wt. % of EPDM and 5 wt. % of Super S carbon black. Both the anode and cathode pellets were formed by pressing about 200–500 mg of the mixture of EPDM and carbon black coated material in a 17 mm die for 30 s with 3500 pounds of force applied by a hydraulic press. The diameter of the pellets was chosen to fit a commercial coin cell case of the type #2325. These coin cells have a diameter of 23 mm and a height of 2.5 mm, before crimping the seal. The cell stack consisted of a three layer sandwich of the cathode, a cell separator, and a carbon anode. The separator, a non-woven polypropylene felt, prevents the two electrodes from contacting directly. The separator also provides a reservoir for the electrolyte solution.

The electrolyte used was a 50/50 mixture by volume of propylene carbonate and dimethoxyethane containing 1M $(CF_3SO_2)_2N^-Li^+$ from 3M company. The salt was dried under vacuum at 160° C. for 24 hours as recommended by the manufacturer. The propylene carbonate was vacuum distilled and the dimethoxyethane was distilled from lithium/naphthalide under helium. The water content of the electrolyte was under 30 ppm as determined by Karl-Fischer titration. The cell was assembled and crimped in a helium filled glove box to prevent the electrolyte solution from reacting with ambient moisture. The coin cell was charged and discharged on custom built cyclers. The fully automated and fully programmable cyclers operate at a constant current anywhere from 0.1 μA to 100 mA, with the current controlled to 0.1 μA, or to 1 part in 4000 for higher currents. The current and voltage are measured every 30 s. The voltage can be resolved to 10 μV over the range 0 to 12 V.

Figure 3:
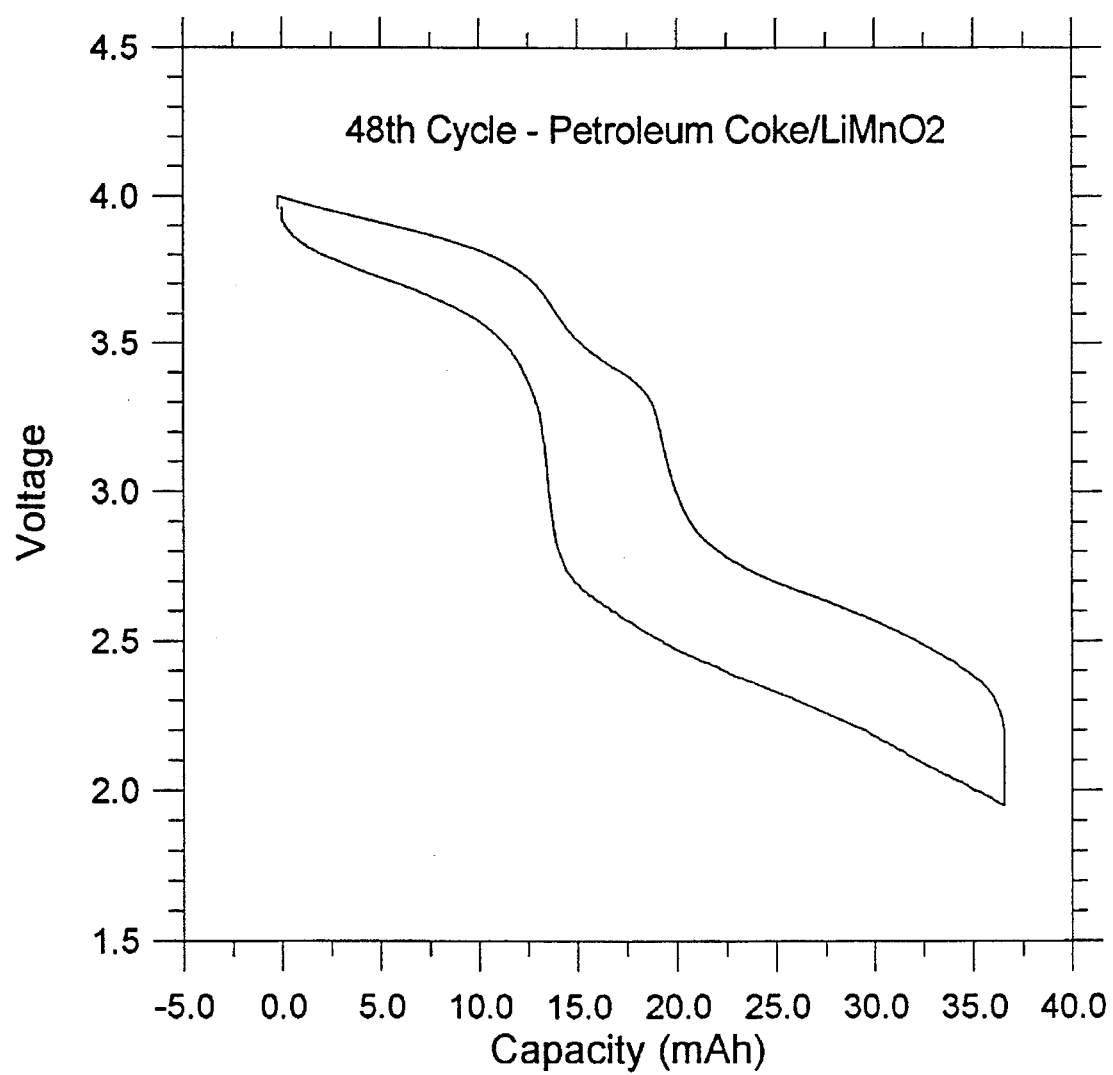
FIG. 3 shows a plot of a typical charge/discharge cycle for an electrochemical cell with a carbon coke anode and a cathode containing orthorhombic $LiMnO_2$.

The anode had a thickness of 0.040" and a weight of 0.301 g, which corresponds to a capacity of 52.3 mAh to a composition of $LiC_{12}$. The cathode was 0.030" thick and weighed 0.312 g which corresponds to a theoretical capacity of 79.4 mAh if all the lithium ions in the cathode can be reversibly cycled. The cell completed 64 cycles at a current of 0.28 mA between voltage limits of 4.0 and 1.95 volts. On the $48^{the}$ cycle the cell had a reversible capacity of 36 mAh (shown in FIG. 3). The capacity began to decrease significantly at about the $56^{the}$ cycle and had diminished to 20 mAh by the $64^{the}$ cycle. The voltage versus capacity plot for orthorhombic $LiMnO_2$ (FIG. 3) is very similar to that of $\lambda$-$Li_2Mn_2O_4$, shown in FIG. 6 of Tarascon and Guyomard, [J. Electrochem. Soc., 138 2864 (1991)].

EXAMPLE 3

Figure 4:
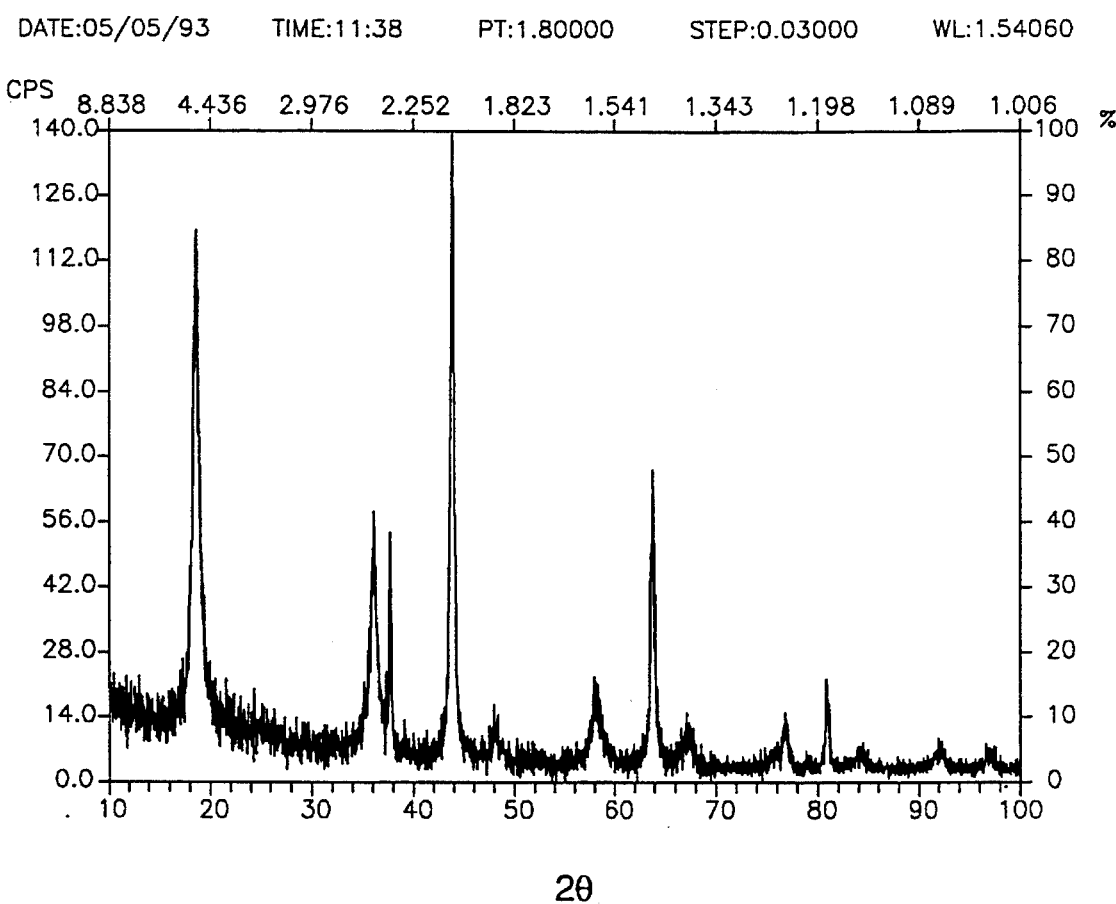
FIGS. 4 and 5 are traces of diffraction patterns of cathodes from the two electrochemical cells described in example 3.

Another two cells were assembled, as described above, with cathodes containing orthorhombic $LiMnO_2$, prepared as described in example 1. The first cell had a 0.045" thick anode weighing 0.354 g made with Conoco XP coke, and a cathode of 0.024" thickness, weighing 0.329 g. The cell completed 49 cycles between 1.8 and 4.0 volts at a current of 0.25 mA. The cell was stopped half way into the $50^{the}$ charge. After a period of relaxation, the open circuit voltage of the cell was 3.04 volts. The cell was disassembled and the cathode pellet was examined by powder X-ray diffraction. The trace of the diffraction pattern, shown in FIG. 4, matches the JCPDF card file for $LiMn_2O_4$.

Figure 5:
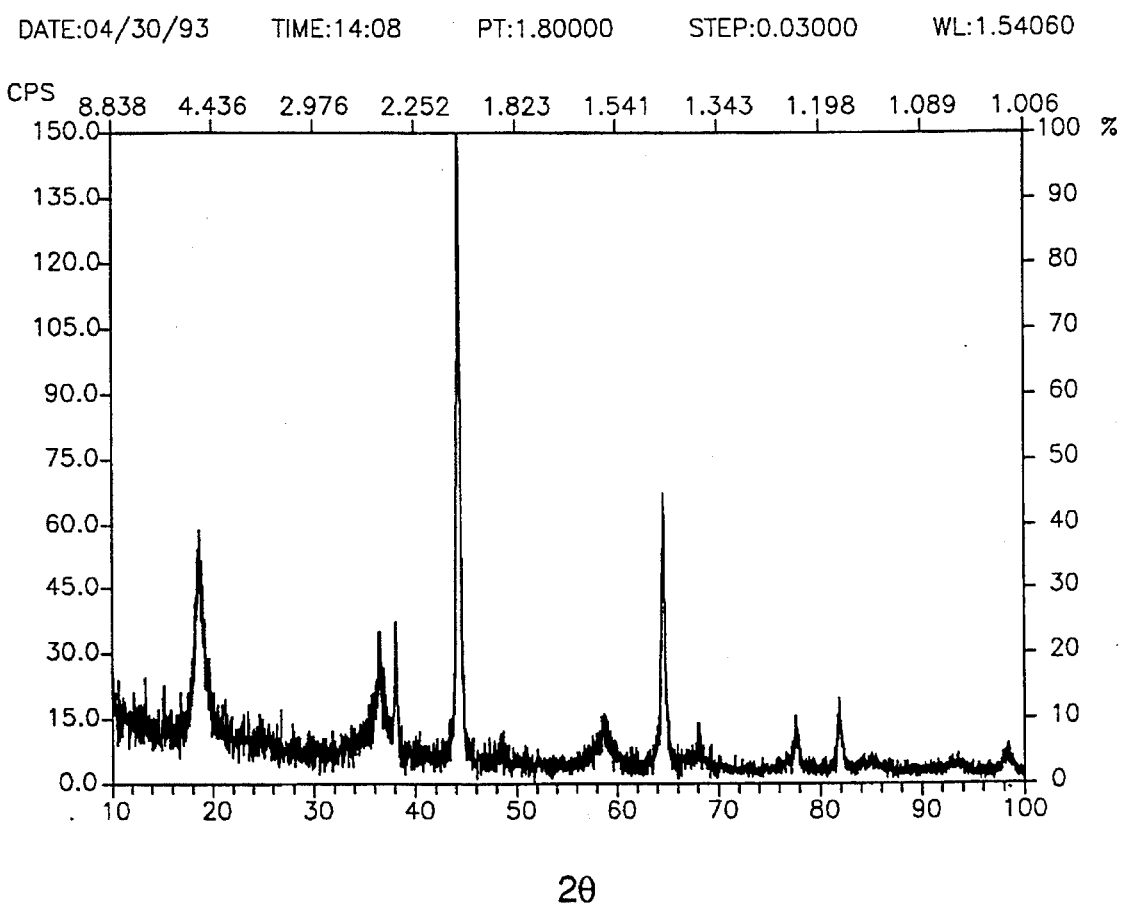

The second cell had a 0.056" thick anode weighing 0.428 g and a cathode of 0.014" thickness and 0.190 g weight. A capacity of 33.7 mAh was required to charge the cell to 4.0 volts at 0.28 mA. This corresponds to a 70% depth of charge of the cathode and to a composition of $Li_{0.3}MnO_2$ in the active material. This cell was cycled between 1.2 and 3.8 volts at 0.20 mA. The cell was stopped after completing the fifth charge. After a period of relaxation the open circuit voltage of the cell was 3.5 volts. The cell was opened and the cathode was extracted for analysis by X-ray powder diffraction. The trace of the diffraction pattern is shown in FIG. 5. The peaks correspond to a cubic unit cell with a=8.143(3) Å. The diffraction pattern matches that described for $Li_{0.6}Mn_2O_4$ [T. Ohzuku, M. Kitagawa and T. Hirai, J. Electrochem. Soc., 137 769 (1990)].

We claim:

1. A method of forming spinel-related $\lambda$-$Li_{2-x}Mn_2O_4$, wherein $0 \leq x \leq 2$, in the cathode of a secondary lithium ion electrochemical cell, which comprises (a) providing a secondary lithium ion electrochemical cell, said cell comprising a lithium intercalation anode, a suitable non-aqueous electrolyte including a lithium salt, a cathode containing as initial active material, orthorhombic $LiMnO_2$ characterized by the specific orthorhombic crystal structure described by the space group Pmnm and unit cell dimensions a=4.572 Å, b=5.757 Å and c=2.805 Å, and (b) charging the cell to de-intercalate sufficient available lithium ions to convert $LiMnO_2$ to spinel-related $\lambda$-$Li_{2-x}Mn_2O_4$ wherein $0 \leq x \leq 2$.

2. A method according to claim 1, wherein the cell is charged to greater than 40–50% of the nominal cathode capacity.

3. A method according to claim 2, wherein the cell is subsequently discharged to at least 30–40% of the nominal cathode capacity to intercalate available lithium ions.

4. A method according to claim 1, wherein the anode comprises a material selected from the group consisting of transition metal oxides, transition metal sulfides and carbonaceous materials, and wherein the electrolyte is in liquid form and includes a suitable organic solvent.

5. A method according to claim 4, wherein the lithium salt is selected from the group consisting of $LiAsF_6$, $LiPF_6$, LiBF$_4$, LiClO$_4$, LiBr, LiAlCl$_4$, LiCF$_3$SO$_3$, LiC(CF$_3$SO$_2$)$_3$, LiN(CF$_3$SO$_2$)$_2$ and mixtures thereof, and wherein the organic solvent is selected from the group consisting of propylene carbonate, ethylene carbonate, 2-methyl tetrahydrofuran, tetrahydrofuran, dimethoxyethane, diethoxyethane, dimethyl carbonate, diethyl carbonate, methyl acetate, methyl formate, γ-butyrolactone, 1,3-dioxolane, sulfolane, acetonitrile, butyronitrile, trimethylphosphate, dimethylformamide, and mixtures thereof.

6. A method according to claim 5, wherein the anode comprises a carbonaceous material.

7. A method according to claim 6, wherein the anode comprises petroleum coke.

8. A method according to claim 7, wherein the electrolyte comprises 1M LiN(CF$_3$SO$_2$)$_2$ in a 50/50 mixture by volume of propylene carbonate and dimethoxyethane.

* * * * *

UNITED STATES PATENT AND TRADEMARK OFFICE
CERTIFICATE OF CORRECTION

PATENT NO. : 5,506,078
DATED : April 9, 1996
INVENTOR(S) : Isobel J. Davidson; Roderick S. McMillan; John J. Murray It is certified that error appears in the above-indentified patent and that said Letters Patent is hereby corrected as shown below:

Column 2, lines 52-53; "a=4.572 , b=5.757 Å and c=2.805 Å" should read --
a=4.572 Å, b=5.757 Å and c=2.805 Å--

Column 2, line 67; "a=4.572 , b=5.757 Å and" should read -- a=4.572 Å,
b=5.757 Å and--

Column 3, line 1; "c=2.805 Å" should read -- c=2.805 Å--

Column 6, lines 50-51; "a=4.572 , b=5.757 Å and c=2.805 Å" should read --
a=4.572 Å, b=5.757 Å and c=2.805 Å--

Signed and Sealed this

Fifth Day of August, 1997

*Attest:*

BRUCE LEHMAN

*Attesting Officer*   *Commissioner of Patents and Trademarks*